Oct. 19, 1937.   J. HARRINGTON   2,096,176
APPARATUS FOR DRYING AND DESTROYING SEWAGE
Filed Dec. 3, 1931   2 Sheets-Sheet 1
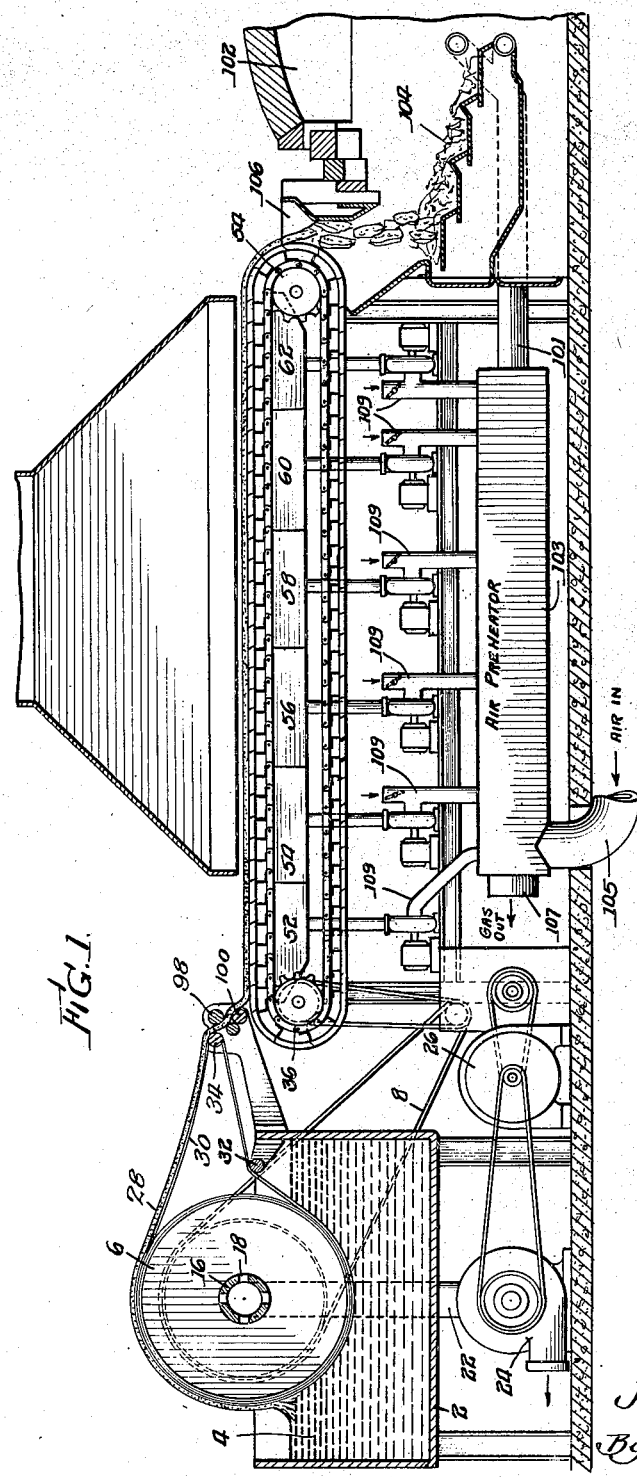
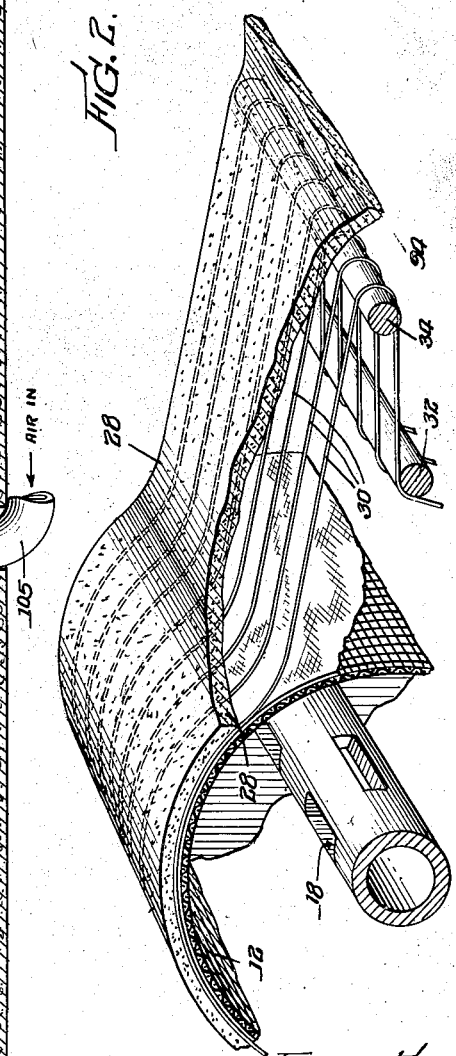
Inventor
Joseph Harrington,
By: Cheever, Cox & Moore
attys Oct. 19, 1937.    J. HARRINGTON    2,096,176
APPARATUS FOR DRYING AND DESTROYING SEWAGE
Filed Dec. 3, 1931    2 Sheets—Sheet 2
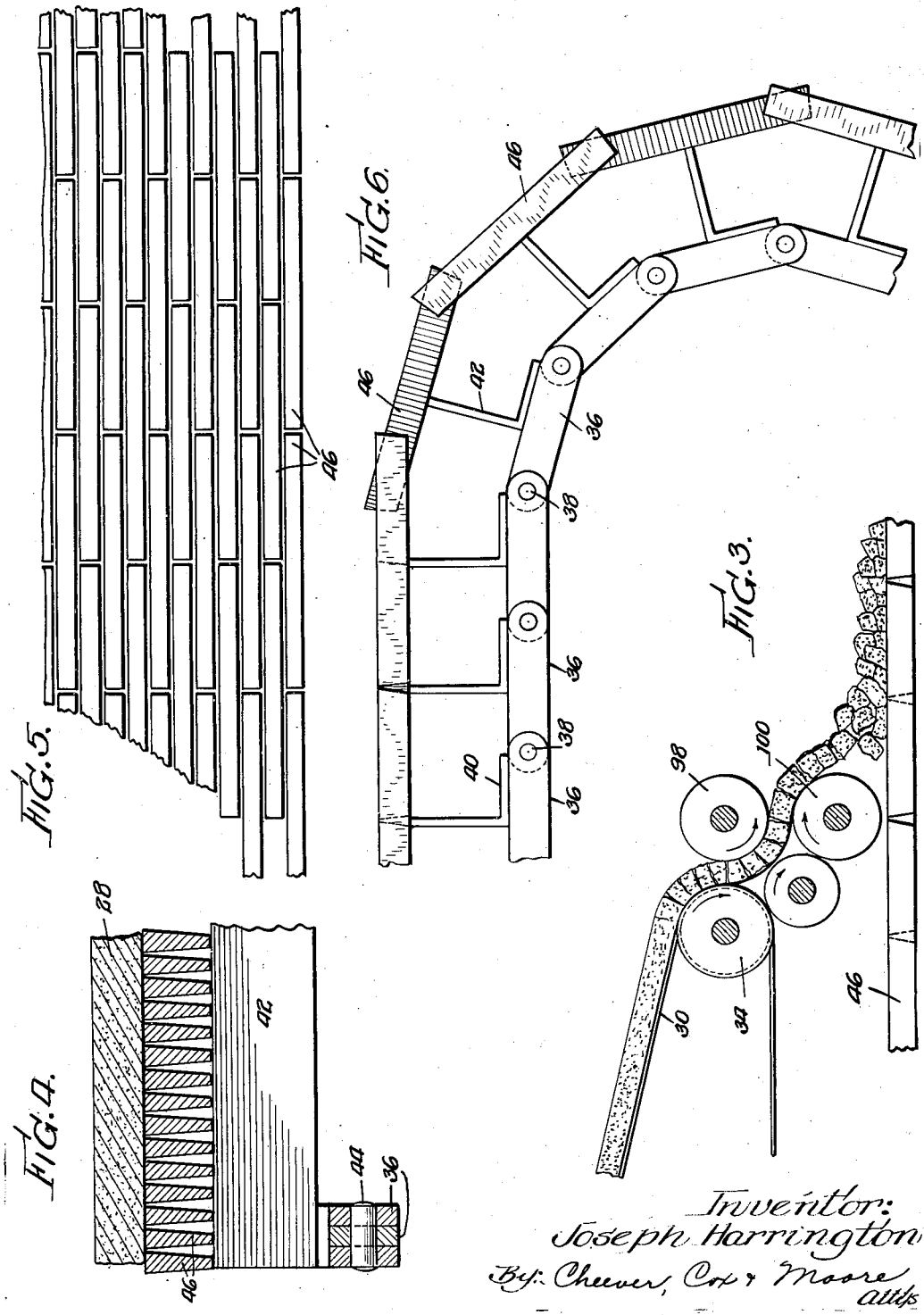

Patented Oct. 19, 1937

2,096,176

UNITED STATES PATENT OFFICE 2,096,176

APPARATUS FOR DRYING AND DESTROYING SEWAGE

Joseph Harrington, Riverside, Ill.

Application December 3, 1931, Serial No. 578,787

6 Claims. (Cl. 34—12)

This invention relates to the treatment of raw sewage sludge and/or sewage, varying in moisture content from about seventy per cent to about ninety-eight per cent.

One of the objects of my present invention is to provide a process and apparatus for drying sewage sludge having substantially the consistency of pressed yeastcake by projecting heated gases therethrough whereby to render the sludge combustibly dry.

Yet another object of my invention resides in a process and apparatus for drying sewage sludge having substantially the consistency of pressed yeastcake and when in sheet form which consists in perforating the sheet of sludge or otherwise heating the sheet to permit the projection of heated gases therethrough to reduce the sludge to combustible dryness.

Yet another object of my invention resides in the provision of a process and apparatus for drying sewage sludge having substantially the consistency of pressed yeastcake which consists in breaking up the sludge into relatively large lumps or pieces and/or into relatively small pieces and passing heated gases into contact therewith to reduce the sludge to combustible dryness.

Another of the objects of my present invention is to provide a means and method for continuously and uninterruptedly forming sheets or slabs of sewage sludge of substantially yeastcake-like consistency and for automatically and continuously feeding the sludge onto a traveling drier associated with heating means so that the moisture contained in the sludge is evaporated and the sludge reduced to commercial dryness for final and sanitary consumption by burning or incineration.

Yet another object of my invention resides in the provision of means for granulating, breaking up or rendering slabs or sheets of the sewage of yeastcake-like consistency whereby to permit the passage of heat or heated gases therethrough to effect the commercial drying of the sewage to permit its incineration or burning.

Yet another object of my invention resides in the provision of a process and apparatus for the destruction of raw sewage and/or sewage sludge by forming the same into a preferably continuous bed or blanket adapted preferably to travel along while projecting heated gas therethrough, and controlling the temperature of the heated gas longitudinally of the travelling bed not only to reduce the bed to combustible dryness but also, if desired, to reduce the bed to combustible dryness without burning or charring the same, whereby the uncharred dried sewage may be used as a fertilizer, or alternatively, may be burned in a furnace or incinerator, and this aspect or object of my invention also contemplates the utilization of the hot products of combustion of the furnace or incinerator for carrying out the drying of additional quantities of the sewage.

These and other objects of my invention will be apparent from a perusal of the following specification when taken in connection with the following drawings wherein Fig. 1 is a side view substantially diagrammatic of one form of my improved continuous apparatus;

Fig. 2 is a substantially diagrammatic perspective view of the manner of stripping the sheet sewage of yeastcake-like consistency from the rotating filter drum and for passing it onto a heater mechanism;

Fig. 3 is a diagrammatic view of means for rupturing or breaking into pieces the sheet sewage of yeastcake-like consistency;

Fig. 4 is a sectional view of my improved type of drier for conveying and drying the sewage;

Fig. 5 is a plan view of the same, and

Fig. 6 is an enlarged detailed view showing the drier making a turn to complete a portion of its endless path.

With reference to Figs. 1 to 4 of the drawings, I have disclosed an apparatus for carrying out a method for drying and/or burning raw sewage or non-fluid sewage sludge reduced to yeastcake-like consistency by means of heated gases and wherein the sewage is subjected to the action of heated gases whereby to dry the sewage to combustible dryness, and while I have disclosed my improved process and apparatus in connection with a common and well-known type of suction filter mechanism for converting liquid sewage or sewage sludge into sheet form of substantially yeastcake-like consistency or of a consistency having substantially from 70 to 85% of moisture, it is to be understood that the features of this part of my invention are likewise applicable to sewage reduced to a non-fluid consistency by the action of the well-known type of filter press.

Referring now to those features of my invention which specifically deal with the treatment of raw sewage or sewage sludge including sewage of a consistency substantially like a yeastcake, i. e., sewage having a moisture-content of from approximately 70 to 85%, I have shown somewhat diagrammatically one type of apparatus for the production of sewage of yeastcake-like consistency and the adaptation and association of such apparatus in combination with the drying mechanism and heat generating mechanism forming the subject of a pending application filed by me and in such a way that the entire apparatus is arranged to provide a method and a continuous and automatically operating means for forming raw sewage or sewage sludge into yeastcake-like consistency in preferably sheet form, in preparing it for drying, in drying and finally incinerating the same and also in the utilization of the generated heat for drying additional quantities of the sewage fed through the device. For instance, in Fig. 1, I have shown rather diagrammatically a tank or container 2 into which is fed in a regulated manner, a desired quantity of raw sewage or substantially liquid or fluid sewage 4. In this tank is rotatably mounted a relatively large drum 6 adapted to be rather slowly rotated by means of belt 8 from a suitable source of power 10. The drum 6 is provided with a foraminated or reticulated or screen-like peripheral surface 12 which may carry a cloth or fabric covering 14. All portions of the drum except the screened, peripheral surface are sealed air-tight. The hub 16 of the drum is formed as a hollow shaft and is formed with a plurality of radial slots or openings 18 connecting the interior of the drum with the passageway 20 of the hub. This passageway 20 of the hub is connected by means of the conduit 22 to an exhauster 24 driven from a suitable prime mover 26. It will be obvious that as the drum slowly rotates in the tank of sewage 4, due to the vacuum created within the drum, a layer of sewage sludge will be sucked onto the periphery of the drum and will be carried around thereon. During such rotation, due to the continuously applied vacuum, sufficient of the moisture in the sewage will be removed therefrom so that by the time the layer of sludge reaches the point 28, Fig. 1, it will contain substantially from 70 to 85% of moisture and will be substantially the consistency of a pressed yeastcake.

Means is provided for automatically and uninterruptedly removing or stripping the yeastcake-like sheet of sludge from the rotating drum. In the present instance, I have provided the periphery of the drum with a plurality of spaced-apart cords or tapes 30, which pass about the periphery of the drum in spaced-apart relation, as shown clearly in Fig. 2, and thence pass over a guide wheel or rod 32 to another guide wheel or rod 34 and thence again around the periphery of the drum. It will be noted that the guide rod or wheel 34 is located immediately adjacent the receiving end or reach of an endless traveling conveyor so that as the sheet 28 of sludge passes over the roller 34, the traveling lines or tapes 30 will pass downwardly and return to the drum, whereas the sheet of sludge will be fed thereby toward and onto the top surface of the traveling conveyor in a continuous manner. In this way the sheet of sludge is stripped from the drum and passed onto the traveling drier.

In lieu of the mechanism shown for transferring the sheet of yeastcake-like consistency of sewage sludge onto the conveyor, I may provide the surface of the rotating drum with a desirable stripper mechanism arranged so as to strip the sheet from the drum. In this event the bar-like supports, or any other type of supports of the drying mechanism will be located immediately beneath the discharge end of the rotating drum so that as the sheet is stripped from the rotating drum it will fall by gravity into the drying conveyor and will then be carried along. If the drying mechanism is spaced apart from the stripper mechanism of the rotating drum, a simple conveyor may be introduced between the two.

As shown in the drawings, the drier comprises a pair of endless chains comprising interconnected links 36 pivotally connected at 38. Each pivotal link carries, or has rigidly fastened to its top, a substantially L-shaped cross support 42. As shown clearly at 36, the upright portion or leg of each cross support 42 carries, at its top, a transversely arranged series of bars 46, there being any number desired to build up the width of drier desired. The bars of the conveyor are spaced apart so as to permit the projection of heated gas upwardly therethrough and through the bed of sludge supported on the surface of the bars. While in the present application the bars are shown as being spaced relatively close together and have a definite function of supporting thereon raw liquid sewage or sewage sludge of relatively high moisture content, I make no claim in the present application to such particular type of conveyor dryer either by itself or in combination with the other features, since such subject matter has been claimed in a co-pending application. In the present instance it is sufficient that the bars of the conveyor dryer be spaced apart any reasonable distance provided the same permit the projection of gases upwardly therethrough and while supporting the bed of sludge of yeastcake-like consistency. In other words, I make no claim in the present application to that feature of my invention wherein the distance apart of the bars of the conveyor is such that the surface tension of the raw sewage or of the sewage sludge of relatively high moisture content serves to support the raw or substantially liquid sewage on the dryer since the same forms the subject matter of a co-pending application. These spaces are those through which the heated air and/or gases for drying of the sludge is forced under pressure. Each drier bar 46 is preferably mounted on the upright leg of the support 42 centrally of the link of the drier bar and the arrangement is such that the ends of each drier bar will overlap the ends of the next adjacent bars so as to provide uniformly dimensioned transverse slots 48 and uniformly dimensioned longitudinally extending slots 50 between the bars. These slots are so arranged to permit the forcing upwardly therethrough of the heated gases as hereinbefore explained, and the bars are pivotally arranged in the manner illustrated in Fig. 6 so that they can readily turn around the end of the drier in the manner shown in Figs. 1 and 6, to move in an endless path. The links 36 of the drier chain pass over and around the two end wheels or pulleys 52 and 54 which are provided with teeth, to inter-fit with the spaces between the links as in the ordinary sprocket and chain construction so as to feed the bars substantially slowly, and in a continuous manner. By reason of this construction, sewage sludge, of yeastcake-like consistency, and in the form of a sheet, or in broken up or granulated condition, may be fed along the path traversed by the drier. It will be noted that the drier provides a series of transverse supporting bars of angle or T-shape having attached thereto a row of narrow, longitudinally disposed bars so spaced as to intermesh with the ends of the adjacent groups and fitted together in spaced-apart overlapping relation, whereby when the separate groups of bars turn around the end sprockets of the drier, a relative movement between the adjacent members will be provided so as to clear the spaces between the two very effectively. This relative motion of the adjacent bars will break up all encrustation of the sewage sludge that tends to clog the spaces between the bars, and clear such spaces.

Means is provided for driving off the moisture content of the sewage sludge on the conveyor supports during its travel from one end to the other, it being understood, of course, that the speed of travel of these bars is adjustably controlled by any appropriate means. In order to heat the sewage sludge I project heated gases, and/or air at a temperature sufficient to rapidly evaporate the moisture in the sewage sludge. In the present instance I have selected a range of temperature as being about from 800 to 1,000 degrees Fahrenheit for accomplishing this purpose, but it is to be understood that temperature ranges may be changed as desired. This heated air and/or heated gases are projected upwardly through the openings in the bars or supports 46 so that the heated gases will have access to the sewage sludge supported thereon. To this end the space beneath the upper horizontal reach or travel of the drier is arranged to provide a chamber, or plurality of chambers into which the heated gases are forced. This chamber is formed by means of appropriate bottom and side walls and by means of a plurality of partitions 54, 56, 58, 60, and 62 which make an air-tight connection so that the only exit from any of these chambers will be through the spaces between the bars. Heated gases are introduced into these chambers 54 to 62 inclusive by means of a series of branch pipes 64 to 74 inclusive, which are in turn, connected. The blowers are driven by means of a belt 80 from any desirable source of power. Each branch 64 to 74 inclusive, is provided with a damper or adjustable control member 82 to 92 inclusive for adjusting the volume of heated gas and/or air which is adapted to pass through any particular chamber. It has been found in practice to be desirable not only to vary the volume of heated gases passing into and through any particular chamber, but also to vary the temperature of said gases. To accomplish this purpose I provide auxiliary inlets to fans or blowers, supplying heated air and/or gases to the various compartments whereby cold, external air may be drawn into the blower to mingle with the heated gases and thereby reduce their temperature. Should the temperature of the gases being passed through the sewage sludge as it approaches dryness not be reduced in temperature, there will be danger of portions of the dried sewage sludge coming to combustible dryness before other portions, igniting from the heat of the gases and partially burning in the drying zone. This is undesirable because of the generation of obnoxious gases at a point not desired, and because such burning provides fissures or spaces in the layer of sewage sludge which would allow large volumes of air to pass therethrough without restriction and substantially reduce the efficiency of the drying process.

In connection with the sewage sludge moisture evaporating means, I provide a furnace, or any type of combustion means, such, for instance, as disclosed in my pending application Serial No. 340,924, having a combustion chamber 104 and a feed hopper 106 arranged preferably below the level of the discharge end of the conveyor. The furnace is adapted to have coal, coke, oil or other fuel added to desired amounts of dried sludge.

I have illustrated herein one form of apparatus for burning the dried products for creating products of combustion with which to perform the drying operation. I provide a furnace or any type of combustion means 102 but preferably of the type shown in my application aforesaid having a combustion chamber 104 and a feeder hopper 106 arranged preferably below the level of the discharge and of the drier and in a position so that the dried residue of sewage sludge is automatically discharged into the hopper. In addition, the combustion chamber 104 has an outlet 108 for the heated products of combustion. In addition, the combustion chamber 104 has an outlet 101 for the heated products of combustion which products are conducted through a heat exchanger or air preheater 103 designed to heat the air which is to be blown up through the sewage sludge on the traveling conveyor dryer. The preheater 103 has an air inlet 105 and a gas outlet 107. The heated air is forced through separate pipes 109 by means of separate motor driven blowers each having a valve-controlled air inlet for diluting the heated gases with cold air for controlling the bed temperature longitudinally thereof.

Means is provided in connection with the traveling sheet or bed of sewage sludge of yeastcake-like consistency for preliminarily treating it so that the heated gases may be passed therethrough or in more intimate contact therewith, effectively and quickly to dry the sewage sludge during its passage along the path of travel of the conveyor. Prior to the drying operation of the sheet or bed of sludge of yeastcake-like consistency, I render the same pervious or porous, or break up the slab, or granulate it so as to permit the heated gases to pass therethrough, whereby quickly and effectively to dry the sludge in its passage along the path of travel of the drier.

For rendering the sheet pervious, porous or permeable, I may provide suitable sheet breaking rollers 98 and 100 associated with the guide roller 34 and the conveyor strings 30 whereby the sheet of sewage sludge of yeastcake-like consistency is given an appropriately tortuous path whereby to break it into relatively large or small slabs or pieces which are fed onto the traveling drier. In Fig. 3 these breaking-up rollers or members are shown as mounted over the path of travel of the drier.

In lieu of this type of breaking-up means I may also provide any desirable type of means for granulating or reducing the sheets or slabs of sludge to smaller pieces to facilitate the drying operation.

In the form of the invention illustrated in Figs. 1 to 6 inclusive it is to be understood that in some instances I treat the sheets or pieces of sludge of yeastcake-like consistency to the action of heated gases without the preliminary perforating, breaking up or granulating operation; the elimination of the perforating, granulating or breaking-up operation step will depend upon the nature of the sheet-like sludge being treated. In most instances, however, prior to subjecting the sheet of yeastcake-like consistency to the action of heated gases, I prefer to give it the preliminary perforating, breaking up, or granulating treatment.

From the foregoing description, it will be evident that I have provided improved means and methods for the commercial destruction of sewage either in a liquid or non-liquid form and I have done so in a manner which is at once economical and expeditious.

Having thus fully described my invention, what I claim as new and desire to obtain by Letters Patent of the United States is:

1. An apparatus of the character described comprising means forming a drier having a foraminous support, means associated with said support for feeding sheets or slabs of sludge of yeastcake-like consistency onto said support, means operatively associated with said support for causing said sludge to travel in a tortuous path abruptly turning, thereby to break up said sludge, and means for passing heated gases into contact with said broken sludge for reducing the same to combustible dryness.

2. An apparatus of the character described comprising a foraminous support forming a dryer, means for feeding sludge to said support comprising the combination of a tank for holding a quantity of substantially liquid sludge, a drum adapted to rotate in said sludge and having a pervious periphery, vacuum means associated with said drum whereby when the same is rotated, a layer of sludge will be formed thereon and reduced to substantially yeast-like consistency, stripping means for removing the sludge layer from the drum and delivering it to said support, means for breaking up the sludge as it is delivered on said support, and means for passing heated gases into contact with said broken sludge on the support for reducing the same to combustible dryness.

3. An apparatus of the character described comprising a foraminous support, means for feeding sludge of yeast-like consistency onto said support, means operatively associated with said support for causing said sludge to travel in a tortuous path, whereby to break up said sludge, means for passing heated gases into contact with said broken sludge for reducing the same to combustible dryness, and means to burn the dried sludge for its final sanitary destruction and to develop the heated gases utilized in drying the sludge in said dryer.

4. An apparatus of the character described, comprising a foraminous support, means for feeding sludge of yeast-like consistency onto said support comprising a filter for separating excess moisture from sewage sludge and delivery means for receiving sludge from the filter and delivering it into said support, means operating to break up said sludge and means for passing heated gases into contact with said broken sludge on said support for reducing the sludge to combustible dryness.

5. An apparatus of the character described, comprising a foraminous support, means for feeding sludge of yeast-like consistency onto said support comprising a filter for separating excess moisture from sewage sludge and delivery means for receiving sludge from the filter and delivering it into said support, means operating to break up said sludge and means for passing heated gases into contact with said broken sludge on said support for reducing the sludge to combustible dryness, and means operatively associated with said dryer to burn the sludge after the same becomes combustibly dry and to apply the heat of combustion of the burning sludge to provide heated gases in the dryer for drying the sludge therein.

6. Apparatus for the sanitary disposal of sewage comprising a foraminous carrier, filtering means adapted to receive liquid sewage and to remove at least a portion of the filterable moisture therefrom and to deliver the residual sewage as a continuous layer upon said carrier, means operatively associated with said carrier for causing said layer to travel a tortuous path to thereby break the continuous layer in pieces, and means for passing heated gases into contact with said broken layer to reduce the material thereof to combustible dryness.

JOSEPH HARRINGTON.